United States Patent [19]

Oldershaw et al.

[11] Patent Number: 4,716,454

[45] Date of Patent: Dec. 29, 1987

[54] CHROMA PHASE WORD ENCODE/DECODE IN A VIDEO PROCESSING SYSTEM

[75] Inventors: Reginald W. Oldershaw, Redwood City; Steven D. Wagner, San Jose, both of Calif.

[73] Assignee: Ampex Corporation, Redwood City, Calif.

[21] Appl. No.: 788,597

[22] Filed: Oct. 17, 1985

[51] Int. Cl.⁴ .................. H04N 9/47; H04N 9/89; H04N 5/78
[52] U.S. Cl. ................................ 358/18; 358/17; 358/310; 360/34.1; 360/36.2; 360/37.1
[58] Field of Search .............. 358/17, 18, 19, 28, 358/320, 323, 326; 360/34.1, 36.1, 36.2, 37.1

[56] References Cited

U.S. PATENT DOCUMENTS

| | | | |
|---|---|---|---|
| 3,890,638 | 6/1975 | Bargen | 358/326 |
| 4,007,486 | 2/1977 | Inaba et al. | 358/19 |
| 4,119,999 | 10/1978 | Gallo | 358/17 |
| 4,591,925 | 5/1986 | Trytko | 358/336 |

Primary Examiner—James J. Groody
Assistant Examiner—Robert M. Bauer
Attorney, Agent, or Firm—Nathan N. Kallman; George B. Almeida; Richard P. Lange

[57] ABSTRACT

A video signal correction circuit of a signal processing system includes means for determining the chroma line type, for inserting the line type information in the video signal, and for extracting the line type information from the video signal downstream to allow selecting the phase of the chroma subcarrier to match the phase of the output station reference.

18 Claims, 4 Drawing Figures

FIG_1

CHROMA PHASE WORD ENCODE/DECODE IN A VIDEO PROCESSING SYSTEM

BACKGROUND OF THE INVENTION

This invention relates to a circuit for enabling the correction of the phase of a color signal in a video processing system, and particularly relates to a circuit and method for inserting chroma phase information in a video data path and for subsequently recovering the chroma phase information downstream.

Presently known video signal processing systems generally employ a main memory for storing video signals and a timing correction circuit for correcting the time base or frequency errors that occur during the processing of the video signal. Such errors in timing or frequency degrade the video signal and the resultant television image.

Another problem that is experiences with video signal processing systems that incorporate relatively complex circuitry is color instability that adversely affects the color representation of the television image.

In the United States, television signal processing systems employ a standard NTSC format wherein each successive horizontal line is characterized by subcarrier signals of opposite phase, so that there are two different line types when using such a format. With the NTSC system, it is necessary that the chroma signal appearing at the output of the videotape recorder be coincident with the phase of the station reference signal, in order to ensure the correct color of the television picture. The television recording systems employ a time base correction network, which includes a chroma processor for correcting color and a dropout compensator to compensate for missing video signals. The time base correction system requires the identification of the incoming subcarrier phase, as well as the output subcarrier phase which then are compared in order to provide proper color correction and the correct color in the resultant television picture.

In countries that use a PAL standard format which employs horizontal lines of four different subcarrier phases resulting in four different line types, identification of each of the line types is necessary for proper color correction.

In prior art systems, circuits for identifying the chroma line type are generally located in a stage or stages preceding the main memory and the time base corrector (TBC) circuit. However, it has been found that with recently developed TBC systems, which are substantial improvements over prior art systems, color correction effectively is accomplished when processing the video signal utilizing the chroma line type information after time base correction is achieved. It would be desirable to accomplish the chroma phase correction after time base correction and with minimal circuitry.

The present invention overcomes the various disadvantages of previous mention in a time base correction system which includes chroma phase correction, wherein color picture stabilization is achieved after the time base correction error has been removed. To this 3end, the invention provides means for carrying the required line type identifying signals through the main time base correction process of the main memory for use on the reference side of the TBC, utilizing a minimal amount of circuitry while eliminating the need for the overhead of additional data bits.

In a television VTR playback system made in accordance with this invention, color correction is achieved by encoding chroma phase as line type information in the form of a digital word at the beginning of the active picture period of each horizontal line of incoming video data and timebase prior to the processing of the video data via the main memory. The chroma line type identified by the digital word is passed to the output of the memory and is extracted to identify each line, whereby phase correction of the chroma signal is accomplished after time base correction in the same channel.

BRIEF DESCRIPTION OF THE DRAWINGS

The invention is described in greater detail with reference to the drawing in which.

DESCRIPTION OF THE PREFERRED EMBODIMENT

Figure 2:
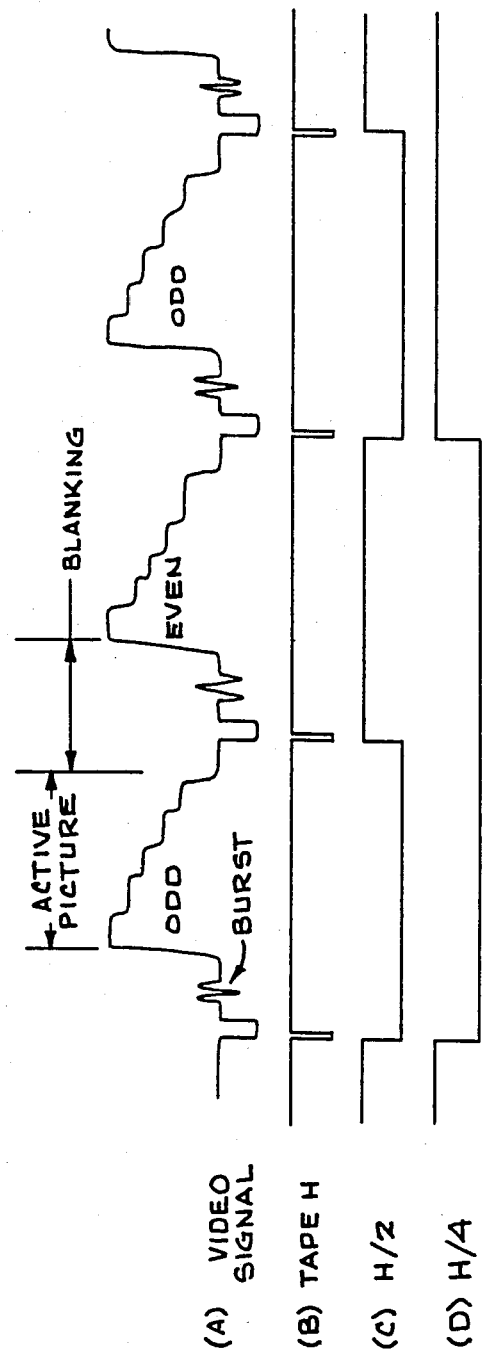
FIGS. 2A–D are waveforms showing the relationship between the horizontal sync and burst of the video signal and the horizontal signals derived from the recorded tape.

In NTSC and PAL television systems, the chroma signal differs in phase successively for each horizontal line. The horizontal lines of the NTSC system appear in a sequence of four different fields consisting of two different types of lines, whereas the PAL system employs an eight field sequence with four different types of lines. Since chroma signal phase correction is required downstream of the main memory, chroma line type references also are needed for identifying the line type in order to be able to process the color signal properly. The line type signals, designated generally as H/2 and H/4 identification signals (FIGS. 2C, 2D) represent respectively one half and one-quarter of the horizontal synchronizing pulse frequency, and may be used in NTSC and PAL format TV systems. Although the following description primarily is directed to the use of H/2 identification signals as used in an NTSC system, the circuit of this invention is also applicable to the PAL system in which H/4 and H/2 identification signals are used.

Further, when a helical scan VTR is operated to create special effects upon the playback of recorded video information, such a slow motion, fast motion, or still frame, or is operated to reproduce recorded video for display as the tape is shuttled at high speed, the speed of transport of the tape is varied during reproduction of the recorded video information and the position of a movable playback head is controlled to maintain it registered with the recorded tracks to video information being reproduced. Thus for special effects and shuttle modes of a VTR, it often is necessary to repeat or skip recorded tracks of television fields. The invention line type insertion technique provides the proper line type identification at the reference side of the memory regardless of the mode of operation.

Figure 1:
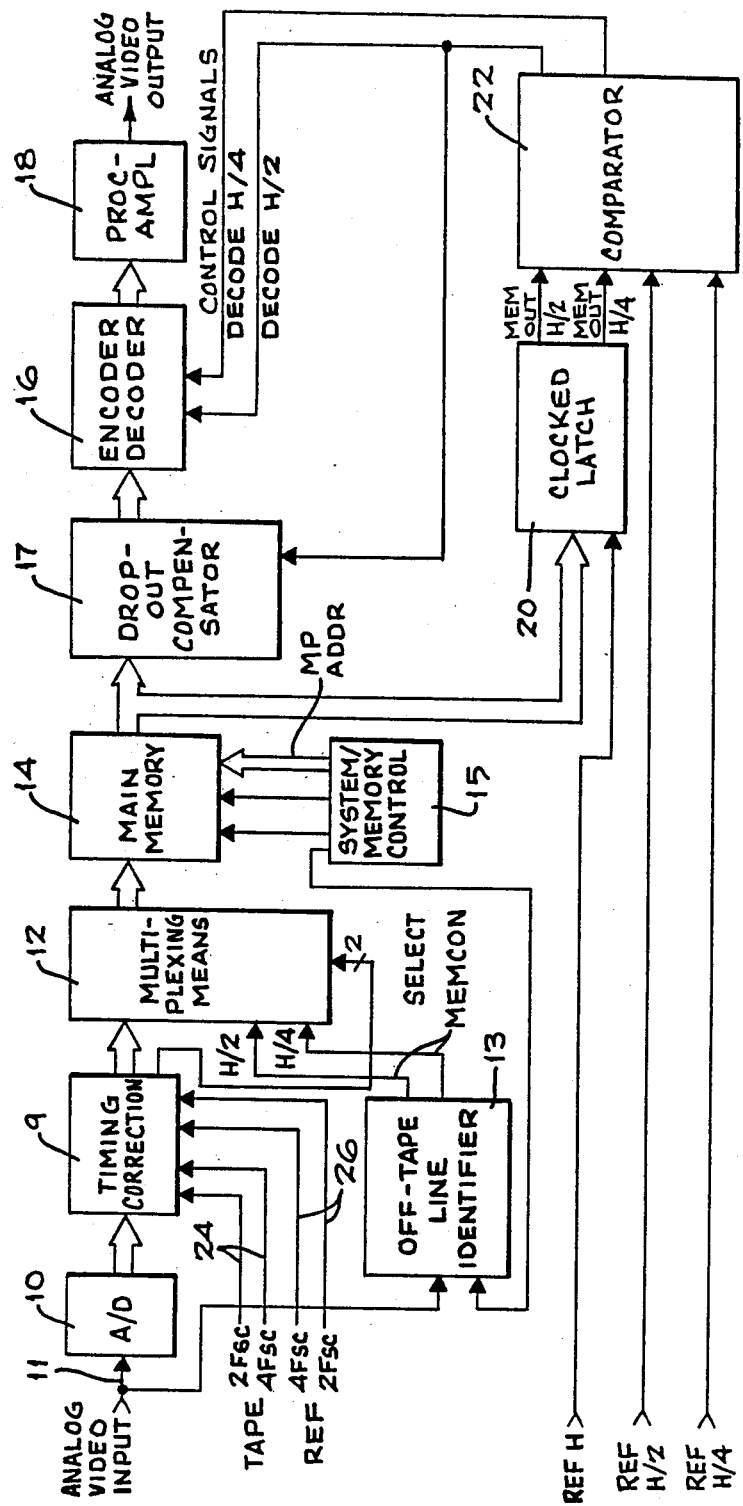
FIG. 1 is a block diagram of the circuit for inserting digital chroma phase information in the video data.

With reference to FIG. 1, an analog video input signal (FIGS. 2A) is obtained from a recorded tape at terminal 11. The off-tape video data signal is converted in a analog-to-digital converter 10 to digital form and is applied to a timing correction circuit 9 and thence to a multiplexing means 12. The timing correction circuit 9 may comprise a four line memory which basically is controlled by tape 2 Fsc and 4 Fsc clocks on lines 24 and reference 2 Fs and 4 Fsc clocks on lines 26. The video data signal is written into the timing corrector circuit 9 via the tape 2 Fsc and 4 Fsc clocks in blocks of selected number of samples corresponding to a horizontal line. Since the data is written into the circuit 9 at the tape rate, with timing derived from the color synchronizing burst that occurs at the beginning of each horizontal line interval of the composite color television signal, the data is not corrected for color subcarrier phase errors as well as other timing errors. To eliminate the subcarrier phase errors, the data stored in the timing correction circuit 9 are read at a time determined by the fixed or stable frequency and phase reference 2Fsc and 4Fsc clocks. Thus the circuit 9 serves to re-time the video signal data obtained therefrom in accordance with the reference clock signals, and to supply the data to the main memory in one line blocks for subsequent time base correction.

Figure 3:
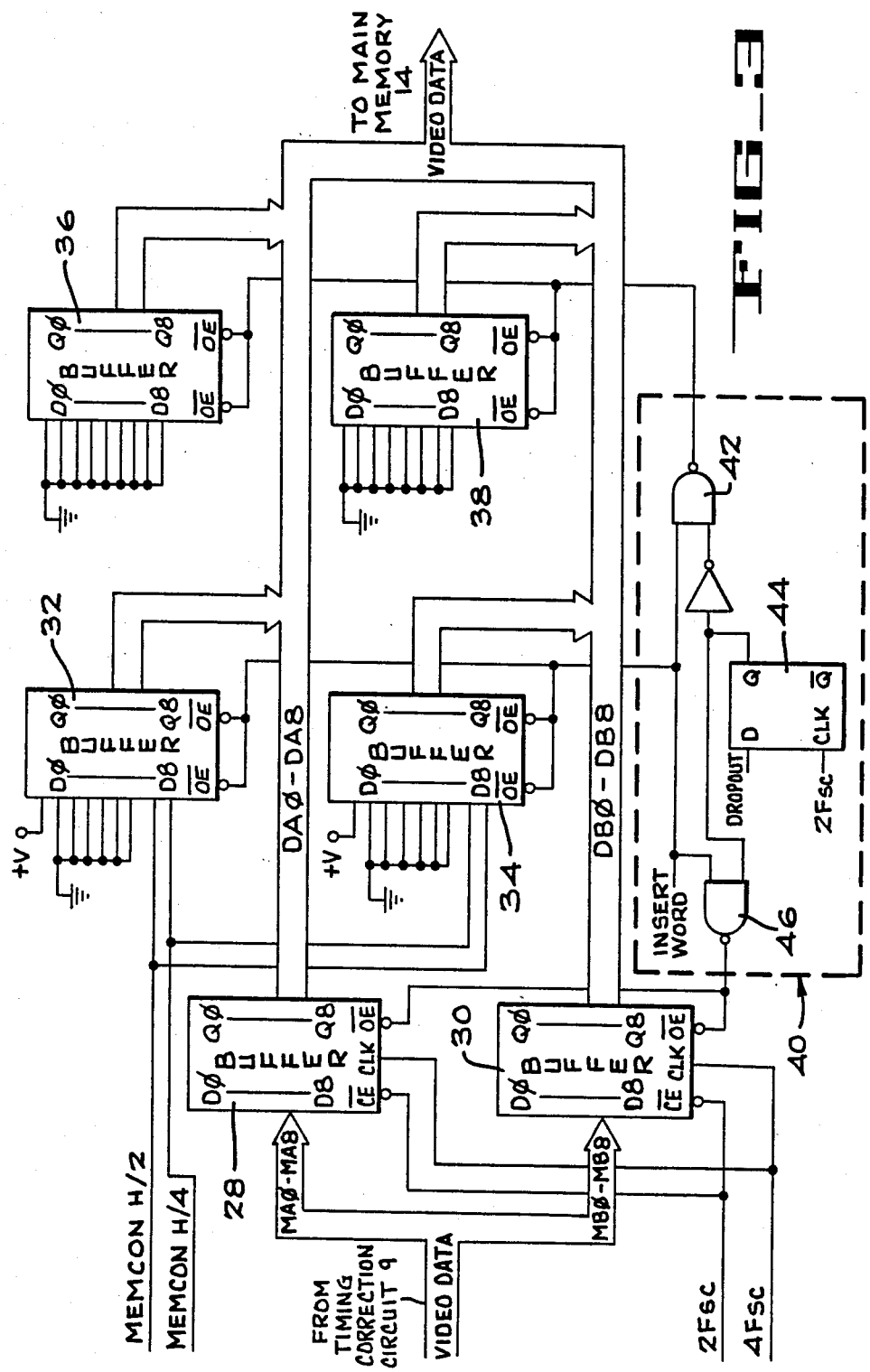
FIG. 3 is a schematic diagram of an implementation of the multiplexing means of FIG. 1.
Figure 4:
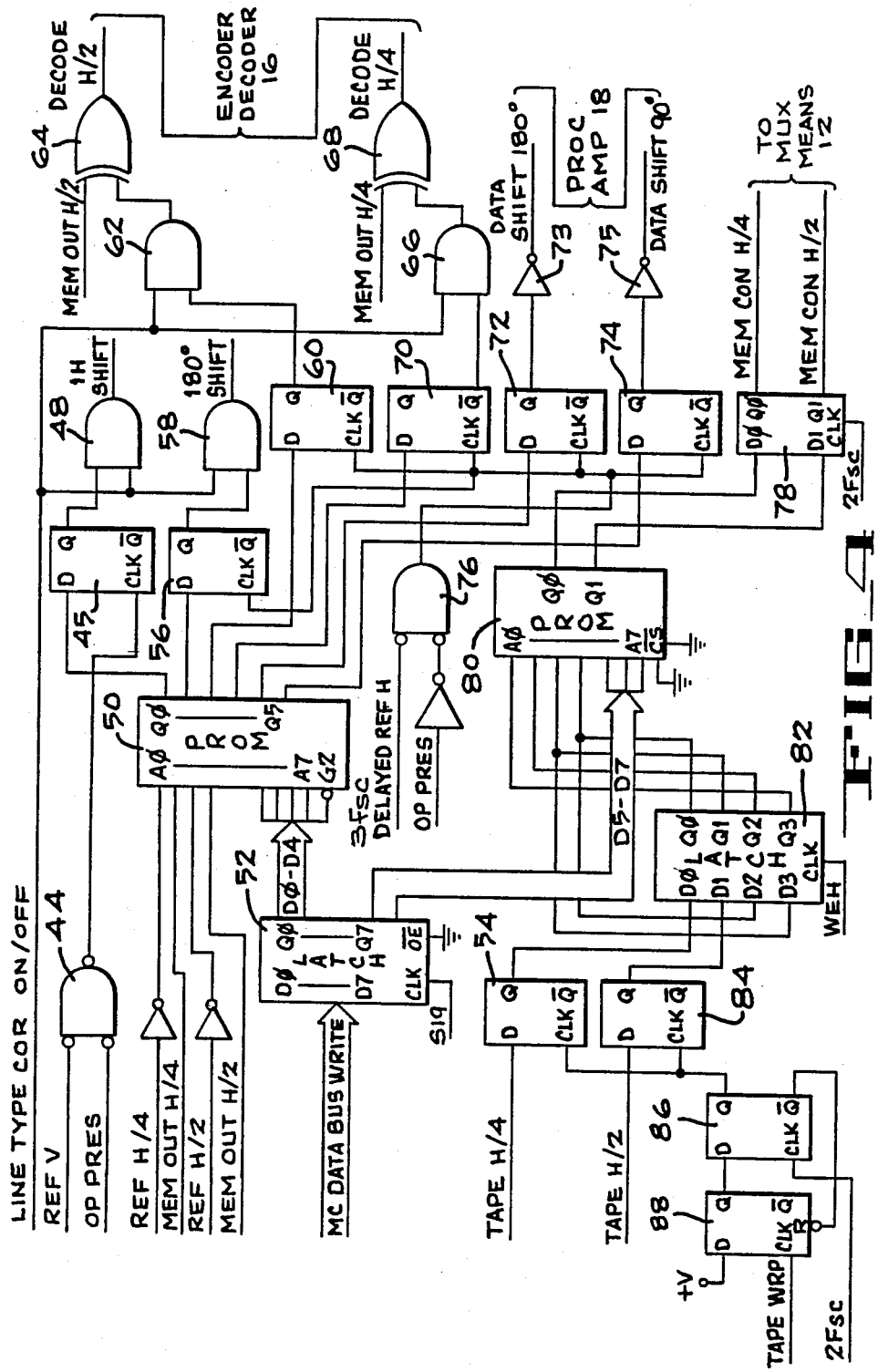
FIG. 4 is a schematic diagram of an implementation of the line type control circuitry integral with the multiplexing means and the comparator of FIG. 1.

The re-timed video signal is supplied to the multiplexing means 12 which also receives chroma line type identification signals MEM CON TAPE H/2, H/4, derived as in FIG. 4 from the tape H/2, H/4 signals extracted from the incoming video signal, to serve as off-tape timing signals. The MEM CON H/2, H/4 signals thus are related to the tape H/2, H/4 signals respectively, and are different, for example, only when the system is in the shuttle or slow motion modes of operation, when data is written into the timing correction circuit 9 at a different rate than data is written into the main memory 14. The multiplexer 12 responds to a SELECT command (further described in FIG. 3 as INSERT WORD and DROPOUT signals) for accepting the MEM CON TAPE H/2 and H/4 identification signals from a line identifier 13, whereby the multiplexer switches from the active picture to the corresponding digital chroma line type word representative of the tape line type.

More particularly, FIG. 3 illustrates a schematic of the multiplexing means 12 used for line type insertion as well as dropout insertion when a dropout occurs. After the re-timed video data samples are supplied from the timing correction circuit 9 in the form of 9-bit words, they are rephased by clocking them through buffers 28, 30 with reference clock signals 2 Fsc and 4 Fsc. Connected to the video bus in parallel with the outputs of the buffers 28, 30 are buffers 32, 34 comprising a line type insertion circuit. Additionally, connected in parallel with the outputs of the first two circuits are buffers 36, 38 comprising a dropout inserting circuit. The video data are multiplexed into two channels to reduce the speed requirements of the buffers 32–38.

These three circuits are connected in parallel to the video data bus at this point so that a choice may be made whether to insert, for a particular sample period of the reference 2Fsc video bus clock, either the sample value output from the line memory in timing correction circuit 9, a sample value indicative of the line type, or a sample value indicative of the presence of a dropout. The selection of which value is inserted in a particular sample location is made by a logic circuit 40 from input signals INSERT WORD and DROPOUT which comprise the SELECT signal of FIG. 1. The selection is accomplished by enabling one of the circuits to allow passage of the sample onto the video bus while the other two circuit outputs are tristated.

The signal INSERT WORD is output from a read address counter (not shown) of the timing correction circuit 9 which indicates that the end of a horizontal line has occurred, and thus that horizontal blanking of the next line is to begin. The read address counter in essence counts the number of samples per active picture line, which number is preloaded and reflects the NTSC, PAL, color standard, and then generates a carry signal which indicates the beginning of the horizontal blanking interval. A low logic level of the INSERT WORD signal selects or enables the outputs of the buffers 32, 34 to insert on the video bus in that sample period the value of the logic levels on their inputs. The values which are inserted are the type of the horizontal line which will next be read out of the line memory in the circuit 9. This information is initiated by a system/memory control module as depicted at 15, FIG. 1, and is supplied as the signals MEM CON H/2, H/4 to the line type insertion circuit by the line identifier 13. The signals are transferred to the video bus at the correct time corresponding to the time of the INSERT WORD.

The buffers 36, 38 of the dropout insertion circuit are enable by the low logic level output of a NAND gate 42. When the buffers 36, 38 are enabled, they insert a word of all zeros (low logic level) on the video bus to indicate the sample is a dropout. The output of NAND gate 42 enables this function when the DROPOUT signal is clocked through a bistable 44 at a 2Fsc rate. The dropout interval is previously detected as video samples having a dropout condition and is detected by an upstream detector and transferred through the timing correction circuit 9 coincident with that particular period. Thus, the dropout insertion circuit exchanges a dropout value for the sample value which was previously stored during the dropout interval. The gate 42 is enabled for the insertion of the word at the time of the DROPOUT signal unless the INSERT WORD signal is present.

The buffers 28, 30 allow the data samples to be clocked through them when the output of a NAND gate 46 is a low logic level, thereby enabling the inverted OE inputs of the devices. The buffers 28, 30 are enabled if neither the INSERT WORD signal nor the DROPOUT signal is present. Otherwise, the NAND gate 46 disables the buffers 28, 30.

Therefore, a priority method for the insertion of the sample values on the video data bus is implemented in this manner. The INSERT WORD signal indicating the end of the active video has first priority and causes line type identification to be inserted in the data stream. The DROPOUT signal has second priority and, in the absence of the INSERT WORD signal, causes dropout identification samples to be inserted in the data stream. Otherwise, which is usually the case, the absence of the INSERT WORD and DROPOUT signals allow the data samples to be passed through the multiplexing means 12 as the data stream.

The digital video data signal, including the digital word indicative of chroma line type information, is applied to a main memory 14. The memory stores the digital video signal and the digital words of the chroma phase information (and the dropout word if a dropout occurs) in blocks of one line of video data. The memory control circuit 15 controls the read/write main memory, and includes a timing generator that produces read and write sync pulses for controlling the timing and location of storage of each video line, including the chroma phase samples. The system memory control circuit 15 provides row/column addresses and various row/column strobes and control signals for the write and read processes for passing the video data signals and the line type information (and the dropout word if present) through the memory 14. The write and read processes are timed whereby mis-positioning of the horizontal and vertical phase is corrected at the output of the main memory 14 to provide a time base corrected signal synchronous with reference signals.

In accordance with the invention, the resulting video signal which has been time base corrected is strobed into a clocked latch 20, that strips two bits from the stored line type word which is read from the main memory 14 as 9-bit words. One of the bits is used in the NTSC standard to identify the two different chroma line types, while both bits are used in the PAL standard to identify the four chroma line types thereof. The clocked latch 20 receives a reference horizontal sync pulse H to enable loading samples of the chroma phase word for each horizontal line. The clocked latch 20 supplied a MEM OUT H/2 (NTSC) and MEM OUT H/4 (PAL) identification signal to a comparator 22 which also receives stable reference H/2, H/4 signals from, for example, a sync generator (not shown) of the TBC. If the logic levels of the MEM OUT signals differ from the reference signals, then the difference is detected by the comparator 22 and a control signal DECODE H/2 is supplied to an encoder/decoder 16 of a color processor circuit. In the PAL standard both the DECODE H/2 and a DECODE H/4 control signals are supplied to the encoder/decoder 16. The encoder/decoder responds to the control signal and separates the chroma from the luminance signal, and then inverts the phase of the chroma signal via a chroma inverter of generally known configuration, to match the phase of the chroma signal to that of the reference signal. The video data signal including the inverted chroma signal are added to the luminance signal and passed to a processing amplifier 18. As an alternative approach, the video data is delayed and shifted by one-half of the color subcarrier cycle or by 180° to match the phase of the station reference signal before being passed to the processing amplifier 18.

The comparator 22 also supplies the DECODE H/2 control signal to the dropout compensator 17 to identify the V-axis switch sense in the PAL standard which is required for dropout compensation. In response to a selected logic level, the compensator 17 determines the reference phase of a PAL modifier circuit which modifies the chroma signal of an adjacent line of video to supply the same chroma phase as the line having the dropout.

FIG. 4 is a schematic of line type control circuitry for receiving the line type information indicative of an incoming tape field sequence from signals TAPE H/2 and TAPE H/4, and the line type information indicative of the desired output reference field sequence from reference signals REF H/2 and REF H/4. The circuitry in turn supplies signals to different components in the TBC to control line type and field sequencing operations in accordance with the invention.

In general, the line type control circuitry comprises two sections; a control signal generation section and a line type data generation section. The control signal generation section is controlled by a PROM 50, and the data generation section is controlled by a PROM 80. A data latch 52 is connected to the write portion of the memory control data bus and provides means for an integral microprocessor (not shown) to write a data work comprising an address, into the PROM 50 via a select line S19. The data outputs D0-D4 of the latch 52 are used by the PROM 50 to select particular sections or address blocks of the memory for decoding inputs A0-A3. Further, the data lines D0-D4 include a bit which either enables or disables the PROM by applying a logic level to its G2 input.

In this way the microprocessor chooses certain decoding sections of the PROM 50 to change the decoding algorithm based on TV standard. The TV standard is set by the operator and decoded by the system/memory control circuit 15. Similarly, the PROM 80 has data lines D5-D7 from the latch 52 connected to its address inputs A5-A7. These address inputs select certain decoding blocks in the PROM 80 for decoding data inputs to its other address lines A0-A3.

The data generation section of the line type control circuitry includes two D-type bistables 88 and 86 which receive a tape write pulse representing the start of a horizontal line, and which produce a clocking pulse which is synchronous with the 2 Fsc clock. The pulse from the Q output of the bistable 86 clocks line type signals, TAPE H/2, TAPE H/4 of the incoming data into bistable devices 54 and 84. This line type information is then clocked into a latch 82 by a write enable signal at reference horizontal rate. Outputs Q0 and Q1 of the latch 82 are connected to two other D inputs of the latch 82. Therefore Q0 and T1 represent the tape H/2 and H/4 signals at the beginning of the present reference horizontal period, while Q2 and Q3 represent the tape H/2 and tape H/4 as they were one reference horizontal period ago. Both pairs of outputs from latch 82 are supplied as four bits of an address for PROM 80. The PROM 80 produces the two signal MEM CON H/2, H/4, and are output to the multiplexing means 12 from the Q0, Q1 outputs of the PROM 80 after being reclocked in a buffer 78 to be synchronous with the 2 Fsc clock pulse. Thus the PROM 80 designates the lines which are to be written into the main memory 14.

The multiplexing means 12 uses these two signals as the two most significant bits of the read address in the line memory integral therein and also inserts these coded signals into the data stream prior to the data of the horizontal line addressed by these bits. In this manner, every horizontal line is preceded by the information as to its type, as it is clocked through the main memory 14 as previously described. These signals are extracted from the data stream after passage through the main memory to become the MEM OUT H/2, H/4 signals which represent available line type to the A1 and A4 address inputs of the line type comparator PROM 50. In combination with the desired line type signals REF H/2, H/4 which are input to the A0 and A2 inputs of the PROM 50, these signals are compared and provide enabling signals to the control portion of the line type control circuitry. The reference signals REF H/2, H/4 indicate the desired output sequence of fields after being decoded by the PROM 50 for TV standard, and the MEM OUT H/2, H/4 signals indicate the actual line type output from the main memory 14 after being decoded by the PROM 50 for the TV standard. Therefore, signals Q0-Q5 of the PROM 50 indicate certain control actions which must be taken if the actual line type is to be changed to the desired line type such that appropriate field sequence or color correction can occur.

The outputs QØ–Q5 of the PROM 50 are distributed to the D inputs of the bistables 45, 56, 60, 70, 72, and 74, respectively. These control signals are clocked at the particular times to become control signals to different parts of the TBC. For example, the QØ output is clocked into bistable 45 by the output of a NAND gate 44 to become the 1H shift signal output from a NAND gate 48. The clock signal from the NAND gate 44 is produced at the system reference vertical REF V, if the color processor encoder/decoder 16 is not present or disabled as indicated by the signal OP PRES. This clocks the line type comparator PROM 50 output QØ into bistable 45 at a vertical rate if the color processor is not present or disabled and will add 1 horizontal line delay to the data path of the video data required for color correction mode by memory control in PAL and PAL-M, when a 90° subcarrier phase is needed, which may be accomplished by that delay. If the color processor encoder/decoder 16 is present and enabled, the vertical timing control for color correction should not be used. This output is the signal generated by the NAND gate 48, 1H shift to the vertical timing control. The NAND gate 48 is enabled by the microprocessor set line type correction on/off signal.

The bistable 56 is clocked by the output of a NAND gate 76 to produce the signal 180° SHIFT at the output of the NAND gate 58. the D input of the bistable 56 receives the Q1 output of the PROM 50 which is an indication that color correction requires 180° degrees shift of color subcarrier phase. The 180° SHIFT signal is generated if the line type correction on/off signal is a high logic level enabling the gate 58. The clocking signal to bistable 56 is timed to the reference horizontal sync signal delayed by three subcarrier cycles. This signal is transmitted through the gate 76 which is enabled by the color processor encoder/decoder 16 being present. Likewise, bistables 60, 70, 72, and 74 are clocked by the output of the NAND gate 76.

The outputs of the bistables 60 and 70 produce color processor color correction control signals DECODE H/2, H/4 if NAND gates 62, 66, respectively, are enabled by the line type correction on/off signal. If no line type correction is to be applied, then the DECODE H/2, H/4 signals are taken directly from the MEM OUT H/2, H/4 signals by exclusive OR gates 64 and 68, respectively. If the line type needs to be corrected, the MEM OUT H/2, H/4 are inverted by the gates 64 and 68. The color processor takes these decoding signals and produces color correction from the input data of the main memory 14 before providing the data to the processor amplifier 18. The bistables 72 and 74 produce data shift signals for the processing amplifier 18 data shift 180°, data shift 90° through respective inverters 73 and 75 if the color processor encoder/decoder 16 is present. The Q4 and Q5 outputs, respectively, decode into the type of delay that the color processor will produce in the data going into the video bus path for the line type and color sequencing data from the PROM 50.

The processing amplifier 18 receives the video from the encoder/decoder 16 and discards the sync and burst portion of the incoming signal and replaces these signal components with new sync and burst derived from the sync generator. The active picture is added to the new sync and burst with a color corrected chroma phase which matches the new burst. The combined signal is passed through a D/A converter and low pass filtered to form the output composite video signal correctly timed to the station reference.

What is claimed is:

1. A circuit for processing video data signals having horizontal sync pulses and chroma burst signals, wherein successive horizontal lines of the video data have different chroma phase information, comprising:
   means for providing a reference line type identification signal;
   means for inserting data in the video data signals which identifies the chroma line type of a horizontal line;
   main memory means for storing the line type information of selectable lines along with the associated video data signals to enable correcting timing errors in both the data signals and the line type information;
   means for comparing the stored line type information with the corresponding reference line type identification signal to develop a line type control signal for the respective line; and
   means for shifting the phase of the respective chroma signal in response to its line type control signal.

2. The circuit of claim 1 wherein the inserting means includes:
   means for generating a digital word indicative of the chroma line type of each selectable horizontal line; and
   means for determining the digital words and associated video data signals to be stored in the main memory means.

3. The circuit of claim 1 wherein said inserting means further includes multiplexing means, coupled to the word generating means, for inserting the word in the video data signals.

4. The circuit of claim 3 wherein;
   the multiplexing means includes means for generating and inserting a digital word indicative of the presence of a dropout; and
   said circuit further includes dropout compensator means, coupled to the comparing means, for compensating for missing video data signals in response to said line type control signal.

5. The circuit of claim 4 further including:
   priority selecting means for assigning first priority to the insertion of the chroma line type digital word, second priority to the insertion of the dropout digital word, and for allowing passage of the video data signals in the absence of the chroma line type and dropout digital words.

6. The circuit of claim 2 including:
   a clocked latch circuit, coupled to said main memory means, for stripping the line type word that is stored and read from said main memory means; and
   comparator means, coupled to the clocked latch circuit, for generating the line type control signal in response to the reference line type identification signal.

7. The circuit of claim 2 wherein:
   said inserting means inserts the digital word in the associated video data signal at the beginning of the respective active video data of the selectable horizontal line; and
   wherein the comparing means includes means for extracting the digital word from the associated video data signal after it has passed through the main memory means.

8. The circuit of claim 7 in a NTSC color television standard, wherein:
the digital word represents a H/2 signal; and
the extracting means extracts the H/2 signal from the main memory means.

9. The circuit of claim 7 in a PAL color television standard, wherein:
the digital word represents H/2 and H/4 signals; and
the extracting means extracts the H/2 and H/4 signals from the main memory means.

10. The circuit of claim 1, wherein said chroma signal phase shifting means includes a color processing circuit for receiving the video data signal after the main memory means and for selecting the chroma signal phase in response to the line type control signal.

11. The circuit of claim 1 including:
a timing corrector circuit, disposed prior to said inserting means, for receiving the video data signal at a rate related to the video data signals and for suppying the video data signal to the main memory means via the inserting means at a reference related rate.

12. A circuit for identifying chroma line types in a video data signal being processed via a main memory, wherein the video data signal includes a horizontal blanking interval, comprising:
means, receiving the video data signal, for inserting a digital word indicative of the chroma line type of a selectable horizontal line, in the horizontal blanking interval of the associated video data signal;
means, including the main memory, for storing the digital word and the associated video data signal of the selectable horizontal line;
means for comparing the digital word after it has passed through the main memory with a respective reference line type identification signal to provide an associated control signal; and
means for shifting, if required, the chroma line type of the respective horizontal line in response to the associated control signal.

13. The circuit of claim 12 including:
means for determining the chroma line type of each selectable horizontal line and for generating the digital word corresponding thereto; and
said inserting means being responsive to the means for determining and generating the digital word.

14. The circuit of claim 13 including:
means for providing an insert word signal; and
wherein the inserting means includes multiplexing means, receiving the video data signal and the digital word, for inserting the digital word in the horizontal blanking interval of the associated video data signal in response to the insert word signal.

15. The circuit of claim 13 including:
means for stripping the digital word inserted in the video data signal after the combined signals pass through the main memory, said comparing means being coupled to the stripping means.

16. A method for processing video data signals including horizontal sync pulses and chroma burst signals, wherein successive horizontal lines of the video data have horizontal identification pulses of different phase, comprising:
providing a reference horizontal line identification signal on a line-by-line basis;
determingin the chroma line type of the horizontal line of said video data signals;
storing selected video data signals and their respective line type information together;
comparing the selected line type information with the respective reference identification signal on a line-by-line basis after recovering the line type information from storage to develop an associated control signal; and
shifting the phase of the chroma signal of the respective video data signal if required, in response to the associated control signal.

17. The method of claim 16 including:
generating a digital word indicative of the chroma line type of the respective horizontal line; and
inserting the digital word in the video data signal prior to the active video of the respective horizontal line.

18. The method of claim 17 including:
extracting the digital word from the respective video data signal after they have been stored; and
supplying the digital word for comparison with the respective reference identification signal on the line-by-line basis to determine the chroma signal line type required.

* * * * *

UNITED STATES PATENT AND TRADEMARK OFFICE
CERTIFICATE OF CORRECTION

PATENT NO. : 4,716,454

DATED : December 29, 1987

INVENTOR(S) : Reginald W. Oldershaw et al

It is certified that error appears in the above-identified patent and that said Letters Patent is hereby corrected as shown below:

```
Column  1, line 20, delete "experiences" insert --experienced--;
           line 63, delete "3end" insert --end--;
Column  2, line  6, delete "data, and timebase prior to the"
                    insert --data, and prior to the timebase--;
           line 58, delete "tracks to" insert --tracks of--
Column  6, line  4, delete "work" insert --word--;
Column  7, line 29, delete "the" (second occurrence) insert
                    --The--.
```

Signed and Sealed this

Ninth Day of August, 1988

Attest:

DONALD J. QUIGG

Attesting Officer

Commissioner of Patents and Trademarks